US012373995B2

(12) United States Patent
Cole et al.

(10) Patent No.: US 12,373,995 B2
(45) Date of Patent: Jul. 29, 2025

(54) METHODS AND SYSTEMS FOR USING COMPACT OBJECT IMAGE DATA TO CONSTRUCT A MACHINE LEARNING MODEL FOR POSE ESTIMATION OF AN OBJECT

(71) Applicant: Verizon Patent and Licensing Inc., Basking Ridge, NJ (US)

(72) Inventors: Stephen Cole, Northbrook, IL (US); Sergey Virodov, San Diego, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 222 days.

(21) Appl. No.: 18/221,032

(22) Filed: Jul. 12, 2023

(65) Prior Publication Data
US 2025/0022184 A1   Jan. 16, 2025

(51) Int. Cl.
| G06T 11/00 | (2006.01) |
| G06T 3/40 | (2006.01) |
| G06T 3/60 | (2006.01) |
| G06T 7/70 | (2017.01) |
| G06T 19/00 | (2011.01) |

(52) U.S. Cl.
CPC ............. *G06T 11/00* (2013.01); *G06T 3/40* (2013.01); *G06T 3/60* (2013.01); *G06T 7/70* (2017.01); *G06T 19/006* (2013.01); *G06T 2207/20081* (2013.01); *G06T 2207/20084* (2013.01); *G06T 2207/20132* (2013.01)

(58) Field of Classification Search
CPC ........... G06T 19/006; G06T 3/40; G06T 3/60; G06T 7/70; G06T 11/00; G06T 2207/20084; G06T 2207/20132; G06T 2207/20081
See application file for complete search history.

(56) References Cited

U.S. PATENT DOCUMENTS

| 11,836,221 B2 * | 12/2023 | Sminchisescu ........... G06T 7/73 |
| 2022/0180548 A1 * | 6/2022 | Li ........................ G06V 10/766 |
| 2022/0237799 A1 * | 7/2022 | Price ....................... G06T 7/174 |
| 2023/0234233 A1 * | 7/2023 | Goyal ..................... G06T 7/269 |
| 2024/0037788 A1 * | 2/2024 | Nimmagadda ........ B25J 9/1697 |
| 2024/0169563 A1 * | 5/2024 | Wen ........................... G06T 7/11 |
| 2024/0378832 A1 * | 11/2024 | Joachim ................... G06T 5/50 |

* cited by examiner

*Primary Examiner* — Xilin Guo

(57) ABSTRACT

An illustrative model construction system may access object image data representative of one or more images depicting an object having a plurality of labeled keypoint features. Based on the object image dataset, the model construction system may generate a training target dataset including a plurality of training target images. Each training target image may be generated by selecting a background image distinct from the object image data, manipulating a depiction of the object represented within the object image data, and overlaying the manipulated depiction of the object onto the selected background image with the labeled keypoint features. Based on this training target dataset, the model construction system may train a machine learning model to recognize and estimate a pose of the object when the object is depicted in input images analyzed using the trained machine learning model. Corresponding methods and systems are also disclosed.

20 Claims, 12 Drawing Sheets

METHODS AND SYSTEMS FOR USING COMPACT OBJECT IMAGE DATA TO CONSTRUCT A MACHINE LEARNING MODEL FOR POSE ESTIMATION OF AN OBJECT

BACKGROUND INFORMATION

Various extended reality technologies (e.g., augmented reality, virtual reality, mixed reality, etc.) developed and deployed in recent years are put to use in various types of entertainment, educational, vocational, and other types of applications. Certain augmented reality applications relate to particular objects that users of the application may encounter and desire to interact with. As one example, an intricate or complex object or product (e.g., a car engine with many intricate parts, a complex piece of machinery on a factory floor, a circuit board with various similar-looking electronic components, a switchboard having rows and columns of similar looking sockets, etc.) may require interaction (e.g., operation, maintenance, repair, troubleshooting, etc.) from a human user. While detailed drawings and instructions may provide useful guidance to the user in these situations, confidently and effectively engaging in such interactions may still be a challenge for the user given the nature (e.g., the complexity, the abundance of similar-looking components with highly-differentiable functions, etc.) of certain objects. Accordingly, augmented reality may provide a helpful vehicle by way of which the drawings and/or instructions may be presented, since certain instructions may be overlaid directly onto an image of the object to be interacted with (e.g., unplug a cable from this socket, plug it into this socket, etc.).

To implement these and/or other augmented reality applications relating to specific objects, an augmented reality device may be configured to accurately and efficiently recognize the object of interest, estimate its precise pose (e.g., location, orientation, etc.) in the world, and compute how an augmentation overlay is to be presented so as to facilitate the desired interaction. Programming or training an augmented reality device to perform such pose estimation for a particular type of object (e.g., a product for which an augmented reality application is being developed, etc.) typically requires significant expertise, effort, time, trial and error, and so forth.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
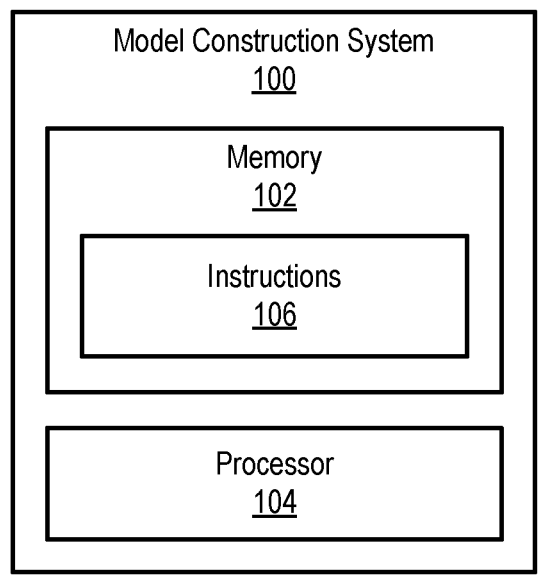
FIG. 1 shows an illustrative model construction system for using compact object image data to construct a machine learning model for pose estimation of an object in accordance with principles described herein.

Methods and systems for using compact object image data to construct a machine learning model for pose estimation of an object are described herein. As described above, there are various augmented reality use cases involving specific objects that may be augmented in particular ways (e.g., to facilitate operation by a user, to facilitate repair or maintenance by a technician, etc.) once the objects can be recognized and their poses estimated. While conventional ways of programming or training a model to perform such object recognition and pose estimation may require large numbers of example images depicting the target object in question (along with significant expertise, effort, time, trial and error, etc.), methods and systems described herein are configured to construct machine learning models for pose estimation of custom objects using relatively small numbers of such image examples (referred to herein as "compact" object image data).

As used herein, "object image data" refers to data representative of one or more images depicting a particular object, such as a target object that a machine learning model is to be trained to recognize and/or estimate the pose of. While conventional training methods may require object image data that incorporates hundreds or thousands of image examples (e.g., to train the model to recognize the target object from different angles, in different contexts or lighting scenarios, etc.), methods and systems described herein are configured to accomplish the same objective using compact object image data. As used herein, "compact" object image data refers to relatively small datasets that include only a small number of unique images (e.g., twenty images, ten images, as few as one image, etc.) of the object. Though this small number of images may be relatively easy for a user to capture, label, and otherwise prepare, systems and methods described herein may allow that compact object image data to serve as the basis for training a robust machine learning model to reliably recognize and estimate the pose of the target object in various circumstances.

As will be made apparent herein, the modest "ask" of such compact object image data to an entity (e.g., a user) seeking to develop a machine learning model associated with a particular object (e.g., a particular product, a complex object for which an augmented reality application is being developed, etc.) may be highly advantageous to that entity. Moreover, along with asking relatively little of the user attempting to produce the object-specific machine learning model in terms of training input, methods and systems are further configured to automate and handle much of the work of generating the machine learning model to further benefit users and free them up to focus on other aspects besides the recognition and pose estimation of the particular objects in question.

As will be described and illustrated in more detail below, methods and systems described herein may use compact object image data to construct a machine learning model for pose estimation of an object by accessing relatively compact object image data (e.g., incorporating a relatively small number of unique images of the object in question), using that compact data to generate relatively large numbers of training target images (referred to collectively as a "training target dataset"), and then using that training target dataset to train effective and robust machine learning models that can be employed within augmented reality applications to reliably recognize and estimate the pose of the target object in real-world environments. For example, as will be described and illustrated in more detail below, the training target images may be generated by overlaying cropped and randomly-manipulated (e.g., scaled, rotated, etc.) depictions of the object onto a variety of different background images (e.g., from a library of background images having no particular relation to the particular object in question).

In some examples, a user overseeing the model construction process may label the relatively small number of object images to indicate certain keypoint features that may be maintained throughout the object manipulations such that each of the relatively large number of training target images also include the labeled keypoint features as ground truth. In other examples, even this "ask" of the user may be omitted and keypoint features may be identified and labeled automatically by the system. In either case, advanced machine learning models (e.g., deep learning models with different types of model heads such as anchor-based model heads, segmentation-based model heads, etc.) may be constructed using the training target datasets such that accurate recognition and pose estimation of the target object may thereafter be reliably performed in the context of whatever application the user desires. For example, the machine learning model may be used to produce a homography or six-degree-of-freedom (6DOF) pose estimation for use by an augmented reality application configured to facilitate operation, construction, repair, or maintenance of the complex objects (e.g., such as by overlaying a map, instructions, animations, etc., onto the object).

Along with other benefits and advantages mentioned above to arise from methods and systems described herein (e.g., automated training of a robust machine learning model based on a relatively modest "ask" of compact object image data including just a few images of the target object, etc.), another significant benefit that will be recognized is that methods and systems described herein do not require readily recognizable markers (e.g., QR codes, etc.) or other such keypoint feature assists that may typically be relied on for object recognition and machine learning model construction.

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for using compact object image data to construct a machine learning model for pose estimation of an object may provide any or all of the benefits mentioned above, as well as various additional and/or alternative benefits that will be described and/or made apparent below.

FIG. 1 shows an illustrative model construction system 100 ("system 100") for using compact object image data to construct a machine learning model for pose estimation of an object in accordance with principles described herein. System 100 may be implemented by computer resources such as processors, memory facilities, storage facilities, communication interfaces, and so forth, implemented on one or more computing systems described in more detail below. In some examples, system 100 (or components thereof) may be implemented by multi-access edge compute (MEC) server systems operating on a provider network (e.g., a 5G cellular data network or other carrier network, etc.), by cloud compute server systems running containerized applications or other distributed software, by on-premise server systems, by user equipment devices (e.g., mobile devices, extended reality presentation devices, etc.), by some combination of these, or by other suitable computing systems as may serve a particular implementation.

System 100 may include memory resources configured to store instructions, as well as one or more processors communicatively coupled to the memory resources and configured to execute the instructions to perform functions described herein. For example, a generalized representation of system 100 is shown in FIG. 1 to include a memory 102 and a processor 104 selectively and communicatively coupled to one another. Memory 102 and processor 104 may include or be implemented by computer hardware that is configured to store and/or execute computer software. Various other components of computer hardware and/or software not explicitly shown in FIG. 1 (e.g., networking and communication interfaces, etc.) may also be included within system 100. In certain embodiments, memory facilities represented by memory 102 and processors represented by processor 104 may be distributed between multiple computing systems and/or multiple locations as may serve a particular implementation.

One or more memory facilities represented by memory 102 may store and/or otherwise maintain executable data used by one or more processors represented by processor 104 to perform any of the functionality described herein. For example, as shown, memory 102 may store instructions 106 that may be executed by processor 104. Memory 102 may represent (e.g., may be implemented by) one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may represent (e.g., may be implemented by) one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when the processor is directed to perform operations represented by instructions 106 stored in memory 102), system 100 may perform functions associated with using compact object image data to construct a machine learning model for pose estimation of an object in accordance with methods and systems described herein and/or as may serve a particular implementation.

Figure 2:
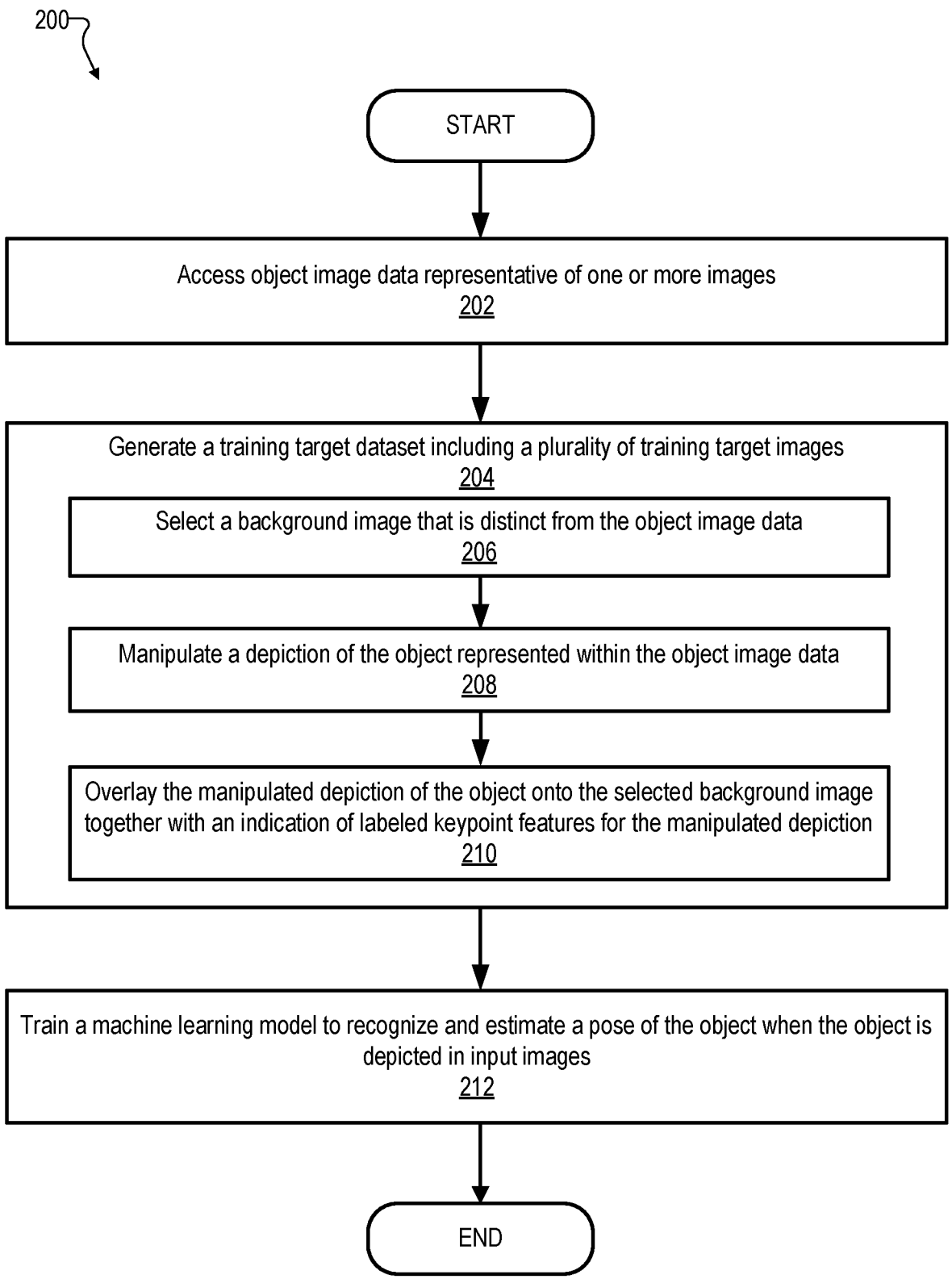
FIG. 2 shows an illustrative method for using compact object image data to construct a machine learning model for pose estimation of an object in accordance with principles described herein.

As one example of functionality that processor 104 may perform, FIG. 2 shows an illustrative method 200 for using compact object image data to construct a machine learning model for pose estimation of an object in accordance with principles described herein. While FIG. 2 shows illustrative operations 202-212 according to one implementation, other implementations may omit, add to, reorder, and/or modify any of the operations 202-212 shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a model construction system such as system 100 and/or any implementation thereof.

In certain examples, an operation of method 200 may be performed by way of a plurality of sub-operations that will also be referred to herein as operations of the method. For instance, as illustrated in FIG. 2, the performance of operation 204 may be performed by performing a sequence of operations 206-210 that are drawn within the bounds of operation 204 to indicate that these may performed in the course of performing operation 204. Each of operations 202-212 of method 200 will now be described in more detail as the operations may be performed by an implementation of system 100 (e.g., by processor 104 executing instructions 106 stored in memory 102).

At operation 202, system 100 may access object image data representative of one or more images depicting an object. For example, as described above, this object image data may be "compact" object image data that is relatively sparse (e.g., including a relatively small number of images such as 1 image or 10 images or another number far less than the hundreds or thousands of images that might be included in a typical model training dataset). The object image data may include a plurality of labeled keypoint features, which, as will be described in more detail below, may be manually labeled (e.g., by a user who directs the capturing of the images and preparing of the object image data) or automatically labeled (e.g., by an automated process that does not require input from a human user) as may serve a particular implementation. Examples of keypoint features and how they are labeled will be described and illustrated below, but it will be understood that keypoint features may be selected to facilitate accurate and efficient recognition and pose estimation of the target object by devices relying on the machine learning model being constructed. To this end, for example, the keypoint features may correspond to corners and/or other prominent features of the object.

At operation 204, system 100 may generate a training target dataset including a plurality of training target images. For example, the training target images of the training target dataset may be generated based on the object image data accessed at operation 202. As used herein, a training target image may refer to an image used for training a machine learning model with respect to a particular target object. For example, training target images may be used to train a machine learning model to recognize and perform pose estimation for a target object depicted in the training target images in the ways described herein. A collection of training target images used to train a machine learning model may include a relatively large number of training target images (e.g., hundreds or thousands or more training target images or, in any case, a significantly larger number of images than may be included in the object image dataset described above) and may be referred to herein as a training target dataset. As mentioned above and as illustrated in FIG. 2, operations 206-210 relate to how one particular training target image of the plurality of training target images included in the training target dataset may be generated at operation 204. It will be understood that operations 206-210 may be performed many times to generate many training target images comprised in the training target dataset.

At operation 206, system 100 may select a background image from a set of background images distinct from the object image data. For example, as will be described and illustrated in more detail below, the background image may be selected from a library of images that is "distinct" from the object image data in the sense that the prospective background images are completely unrelated to the target object and/or to the images of the object image dataset. That is, the background images may be captured at a different time from the images of the object image dataset, may present unrelated subjects than the target object, may be used as background images for lots of different types of target objects, may be randomly culled from suitable sources of public images (e.g., free or paid stock image libraries on the Internet, etc.), and so forth. For example, if the target object depicted in the object image dataset is a large optical switchboard hub used in a data center, the set of background images from which the background image may be selected at operation 206 may include images captured in data centers (e.g., the same or different data centers as the one in which the target object is located) and/or images of completely unrelated things such as natural landscapes, indoor spaces within homes or offices or other places other than data centers, people or animals in various settings, and so forth.

At operation 208, system 100 may manipulate a depiction of the object represented within the object image data. For example, as will be described and illustrated in more detail below, a particular image included in the object image dataset may be cropped to eliminate content other than the depiction of the target object (e.g., the optical switchboard in the example mentioned above), and this cropped depiction of the object may be rotated (in two dimensions or in three dimensions), scaled to a different size, and/or otherwise manipulated so as to have a unique appearance different from the original depiction in the object image dataset. As will be described, in some examples, this manipulation may be performed using random values (e.g., random amounts of rotations, random directions of rotations, random scaling amounts, etc.) so that a different outcome may occur for each time operation 208 is performed (even if the same object image is employed). Additionally or alternatively, such manipulation may be performed in a non-random (e.g., systematic, programmatic) manner such as based on a predetermined plan with predesignated sets of manipulation parameters.

At operation 210, system may overlay the manipulated depiction of the object (i.e., the outcome of operation 208 described above) onto the selected background image (i.e., the background image selected at operation 206). Additionally, since the original depiction of the target object in the object image dataset included the plurality of labeled keypoint features (as described above in relation to operation 202), the manipulated depiction of the target object may be overlaid onto the background together with an indication of those labeled keypoint features for the manipulated depiction. For example, if corners of a particular panel of a switchboard object mentioned in the example above had been labeled as keypoint features, those features would be maintained through the image manipulation at operation 208 so that, when the depiction is overlaid onto the background to form the particular training target image, the labeled keypoint features are still indicated in data associated with the training target image.

As mentioned above, operations 206-210 may be performed a number of times to generate a number of training target images that may all ultimately be included within the training target dataset of operation 204. As these operations are performed, various elements of random or systematic variation may be introduced (such as mentioned above and as will be described in more detail below), such that a variety of different poses of the target object with different relative sizes are labeled with keypoint feature ground truth against a variety of different background images. In this way, a large and robust training target dataset may be produced even though the original object image dataset was relatively compact and the set of background images were distinct from and unrelated to the target object (e.g., the stock photo library or similar collection of unrelated images, as described above).

At operation 212, system 100 may train a machine learning model based on the training target dataset generated at operation 204 (e.g., by way of repeated performance of operations 206-210). For example, the machine learning model may be a deep learning model trained, in accordance with principles described in more detail below, to recognize and estimate a pose of the target object when the object is depicted in input images analyzed using the trained machine learning model.

Figure 3:
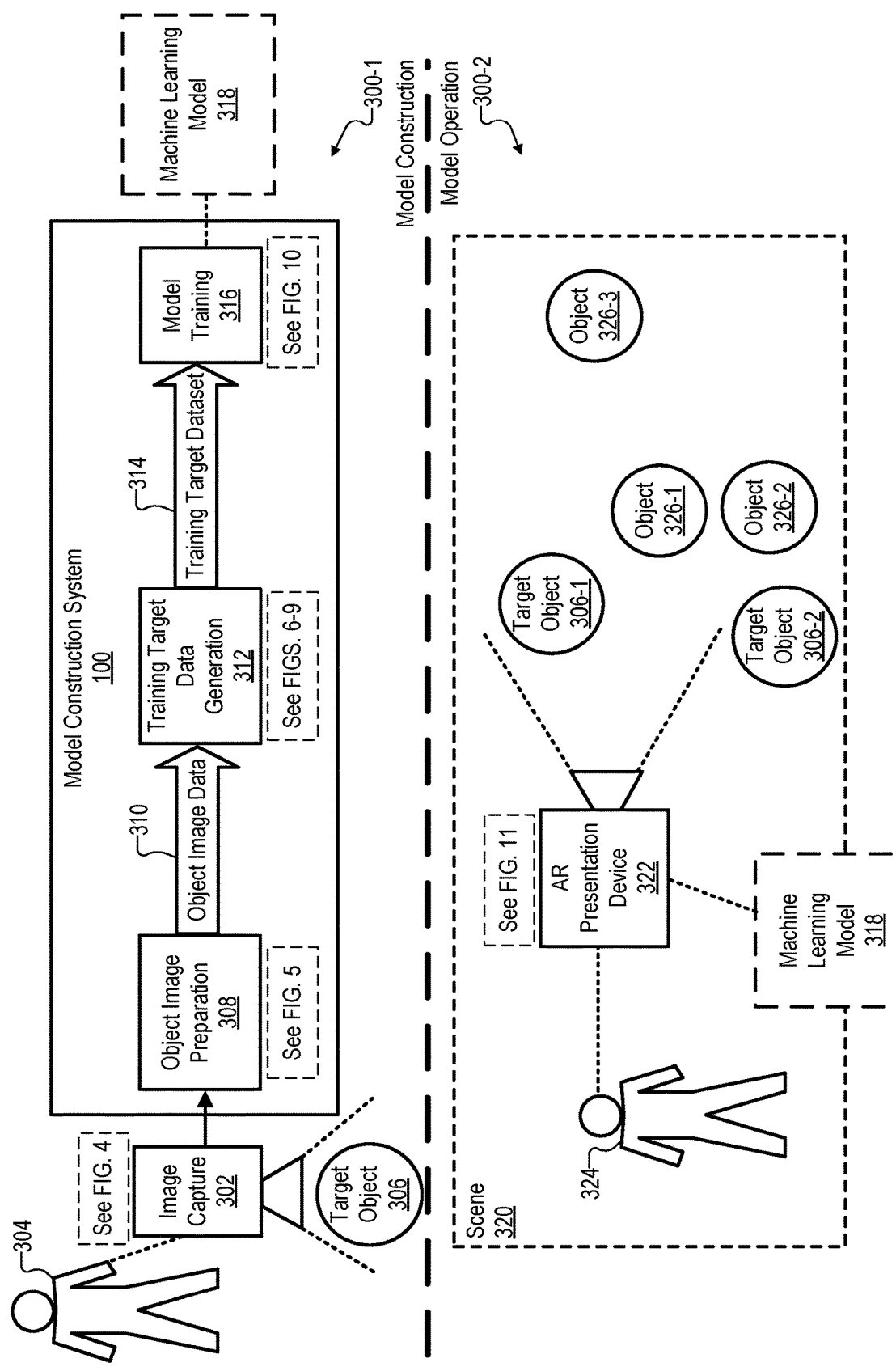
FIG. 3 shows illustrative configurations in which an example model construction system and a machine learning model constructed thereby may be used in accordance with principles described herein.

To illustrate this training process for the machine learning model (as performed by system 100 in accordance with method 200) and then the operation and use of the machine learning model for an example augmented reality application or use case, FIG. 3 shows illustrative configurations 300 (configurations 300-1 and 300-2). In these configurations 300, an example model construction system and a machine learning model it constructs may be used in accordance with principles described herein. More particularly, as indicated by text on either side of a dashed line separating the two configurations 300, configuration 300-1 may represent a configuration in which a machine learning model is constructed in accordance with method 200 ("Model Construction"), while configuration 300-2 may represent a configuration in which this machine learning model is put to use by an augmented reality ("AR") presentation device ("Model Operation").

Referring first to configuration 300-1, FIG. 3 shows various aspects related to the construction of a machine learning model. For example, an image capture 302 under supervision of a user 304 is shown to capture images of a target object 306 (i.e., an object that user 304 may desire a machine learning model to target for recognition, pose estimation, etc.). Preliminary images of target object 306, produced as part of image capture 302, may be the subject of object image preparation 308, which system 100 may perform in an automated fashion or with manual assistance from user 304 or another person. For example, object image preparation may involve cropping the depictions of target object 306 from the preliminary images, straightening or otherwise adjusting the depictions, and applying labels to certain keypoint features on the object depictions. The output of this object image preparation 308 is shown to be object image data 310, which may be provided for training target data generation 312 to use in generating a training target dataset 314. As shown, training target dataset 314 may then be used in a model training 316 that results in a machine learning model 318 that is trained and ready for use in an augmented reality application.

To this end, configuration 300-2 shows a scene 320 in which an AR presentation device 322 used by a user 324 (e.g., the same or a different user as user 304) uses machine learning model 318 to process input images that of objects present at scene 320. For example, as shown, certain of these objects (represented by circles in FIG. 3) are instances of target object 306 (e.g., target objects 306-1 and 306-2), which, based on machine learning model 318, should be recognized, identified to be posed at a particular location and orientation within scene 320 (e.g., by way of pose estimation techniques relying on machine learning model 318), and augmented by AR presentation device 322 as may suit the particular augmented reality use case. Other objects at the scene (also illustrated by circles for this example) are shown to be objects 326 (e.g., objects 326-1, 326-2, and 326-3) and will be understood to be non-target objects that should be largely ignored by AR presentation device 322 based on machine learning model 318 (e.g., such that no object recognition, pose estimation, or augmentation is performed with respect to these non-target objects).

As illustrated by dashed boxes near various elements of configurations 300, FIG. 3 will serve as a touchpoint by way of which various additional principles will now be described with reference to other figures. Specifically, as shown, certain aspects of image capture 302 will be described with reference to FIG. 4, certain aspects of object image preparation 308 will be described with reference to FIG. 5, certain aspects of target data generation 312 will be described with reference to FIGS. 6-9, certain aspects of model training 316 of machine learning model 318 will be described with reference to FIG. 10, and certain aspects of AR presentation device 322 will be described with reference to FIG. 11.

Figure 4:
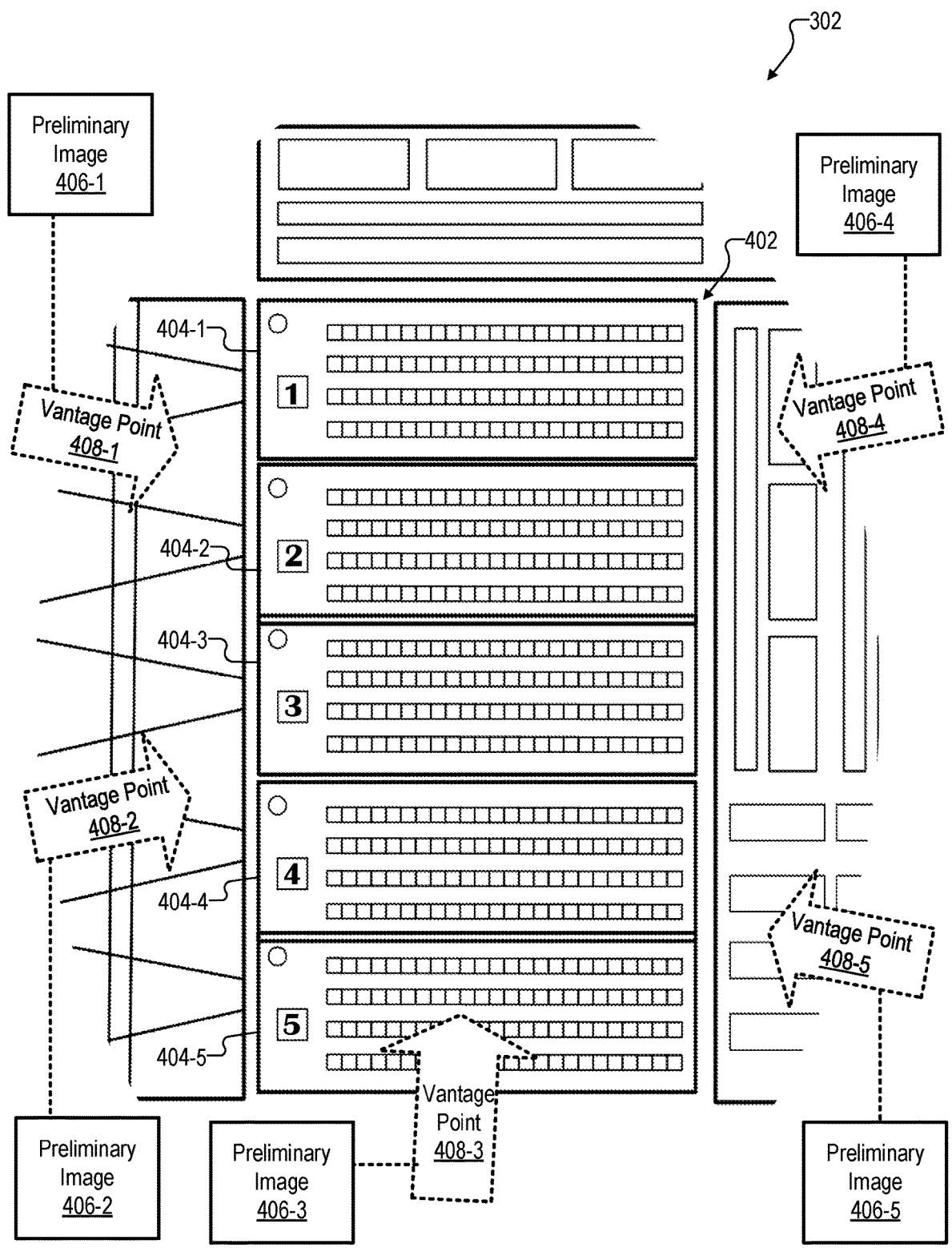
FIG. 4 shows illustrative aspects of how compact object image data may be captured for use in constructing a machine learning model for pose estimation of an object in accordance with principles described herein.

FIG. 4 shows illustrative aspects of image capture 302 to illustrate how compact object image data may be captured for use in constructing a machine learning model for pose estimation of an object in accordance with principles described herein. More particularly, FIG. 4 shows a view of a scene in which an object 402 is depicted alongside various other objects in the room. It is noted that FIG. 4 shows enough of these other objects to illustrate that they may be present, but fades out on them to make room for other elements described below (since object 402 is the most important object for the discussion that follows). As shown, object 402 in this example is a switchboard object that comprises a plurality of switchboard panels 404 (i.e., switchboard panels 404-1 through 404-5). As such, object 402 is also referred to herein as switchboard 402.

As illustrated, switchboard panels 404 may be similar to one another, though there may be slight differences that allow for them to be distinguished from one another. For example, as shown, each switchboard panel 404 may include a sticker or other such indicator displaying a unique index number (i.e., "1" through "5" in this example) to facilitate distinguishing the panels from one another. Other differences in these otherwise similar panels could relate to what cables are plugged in within the switchboard panels, though, for sake of illustrative simplicity, no cables are explicitly shown as being plugged into any of the switchboard panels 404 in FIG. 4.

As will be described in more detail below, either the entire switchboard 402 or a single switchboard panel 404 may be the target object for which machine learning model 318 is trained. In either case, the relationship of the entire switchboard 402 to the individual switchboard panels 404 may facilitate recognizing and identifying keypoint features of the target object (e.g., using a two-tier procedure described in more detail below). For instance, if the switchboard 402 is recognized with a few basic keypoints, this fact may make it easier to find and identify more detailed keypoint features of each of the five panels where they are expected to be (even if some of the keypoints are occluded or obscured by cables or the like). Similarly, if a few switchboard panels 404 can be individually recognized, this fact may make it easier to find and identify the larger switchboard 402 object (e.g., since it may be known to be made up of five stacked panels 404 in illustrated configuration).

As mentioned above, user 304 may desire to construct a machine learning model that is trained to recognize and estimate the pose of a target object such as switchboard 402 or switchboard panels 404. To this end, user 304 may oversee the capture of a plurality of preliminary images 406 (e.g., preliminary images 406-1 through 406-5 in this example) that each depict at least part of the target object from a different vantage point 408 (e.g., vantage points 408-1 through 408-5, respectively). The arrows representing vantage points 408 are drawn so as to illustrate different angles and orientations that preliminary images 406 may have with respect to object 402. For example, user 304 may use a camera or other suitable image capture device to capture preliminary images 406 from a straight-on angle directly in front of the object (e.g., vantage point 408-3), from higher angles (e.g., vantage points 408-1 and 408-4) and lower angles (e.g., vantage points 408-2 and 408-5), from a left-side perspective (e.g., vantage points 408-1 and 408-2) and a right-side perspective (e.g., vantage points 408-4 and 408-5), and so forth. In some examples, certain preliminary images may be captured so as to have different lighting conditions or to otherwise exhibit distinctions born of different circumstances (e.g., captured at different times of day, captured with different configurations of cables plugged into the switchboards, etc.).

It will be understood that the particular vantage points 408 and preliminary images 406 illustrated in FIG. 4 are examples provided only for purpose of illustration. However, this particular example having this relatively small number of preliminary images (only five images in this case) will be understood to be an illustration of the concept of "compact" object data that has been described. As will be shown as this example is extended throughout FIGS. 5-11 below, a large and robust training target dataset may be generated based on only this relatively small number of preliminary images from this relatively limited set of vantage points.

As will be made more apparent below, the flat, planar nature of object 402 and its individual panels 404 may contribute to it being a good candidate for using compact object image data to construct a machine learning model in accordance with principles described herein. For instance, since the switchboard 402 and switchboard panels 404 are planar objects with flat surfaces and with only a single face that is to be recognized (i.e., other faces of the switchboard may be occluded by surrounding objects and not interacted with by technicians, such that only the face shown in FIG. 4 is of interest for a particular augmented reality use case), methods and systems described herein may rotate this planar object in three dimensions (along with performing other manipulations described herein) and juxtapose that against random backgrounds to effectively generate a large number of training target images of a robust training target dataset. It will be understood that non-planar objects or objects that may be desirable to recognize from various different angles (e.g., human subjects, human faces, etc.) may benefit from various principles described herein, but the techniques described may be especially effective and useful for complex planar objects such as switchboard 402 and similar types of target objects (e.g., routing hubs, server racks, etc.).

Returning to FIG. 3, image capture 302 of target object 306 is shown to be performed, in this example, outside of system 100, such that object image preparation 308 begins with input from image capture 302. For example, image capture 302 may provide preliminary images 406 to system 100 and these preliminary images 406 may be processed as part of object image preparation 308 to generate object image data 310 in the ways described above in relation to method 200.

Figure 5:
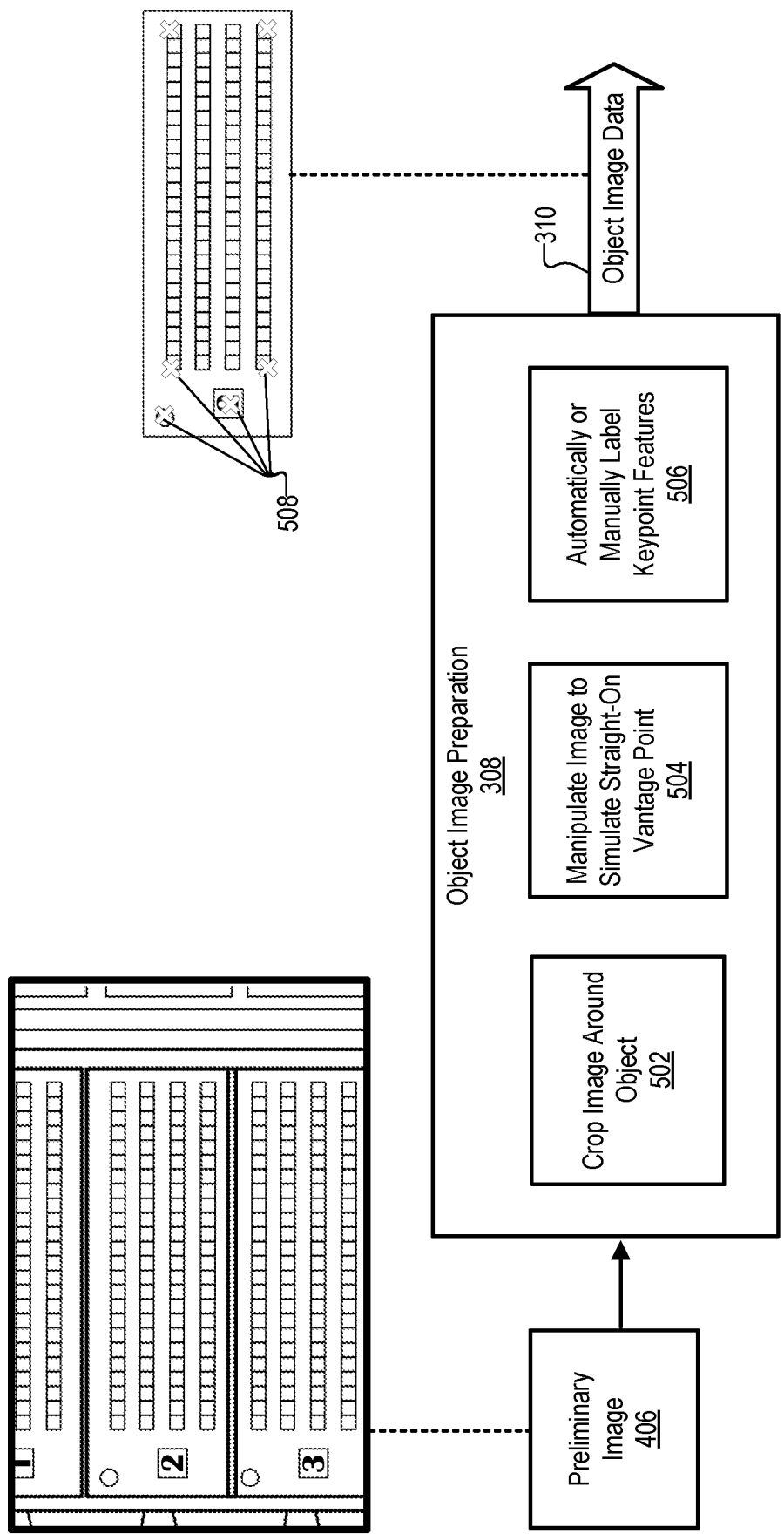
FIG. 5 shows illustrative aspects of how compact object image data may be prepared for use in constructing a machine learning model for pose estimation of an object in accordance with principles described herein.

To illustrate, FIG. 5 shows certain aspects of object image preparation 308 to illustrate how compact object image data may be prepared for use in constructing the machine learning model in accordance with principles described herein. In FIG. 5, object image preparation 308 is shown to receive a particular preliminary image 406 that depicts a portion of object 402 including an entirety of switchboard panel 404-2 and portions of switchboard panels 404-1 and 404-3 and surrounding objects. For this example, switchboard panel 404-2 will be considered to be the target object that machine learning model 318 is to be trained on.

FIG. 5 will be understood to illustrate certain aspects of the accessing of object image data 310 as described above in relation to operation 202 of method 200. For example, as shown in FIG. 5, the accessing of object image data 310 may include: 1) receiving a set of preliminary images depicting the object from a plurality of different vantage points (i.e., illustrated by the input of preliminary image 406, which will be understood to represent one of potentially several preliminary images 406 that may be received), and 2) generating object image data 310 based on this set of preliminary images 406 by way of object image preparation 308. For its part, object image preparation 308 is then shown in FIG. 5 to be performed by way of operations 502, 504, and 506. As indicated, operation 502 may be performed by cropping each preliminary image 406 around the object (e.g., cropping the illustrated preliminary image 406 to remove all the content except switchboard panel 404-2). Operation 504 may be performed by manipulating each preliminary image 406 to simulate a straight-on vantage point of the object (e.g., warping the cropped image to a vantage point arranged normal to the plane of the object so as to simulate a view from directly in front of the object). Operation 506 may be performed by labeling (e.g., automatically labeling, or providing a user interface for manually labeling), keypoint features of the object within each preliminary image 406 subsequent to the cropping and manipulating of the preliminary image.

FIG. 5 shows an example of one prepared object image that may be output from object image preparation 308 and included in object image data 310. Specifically, when the input preliminary image 406 appears as the image shown on the left and each of operations 502, 504, and 506 of object image preparation 308 are performed as described above, the result may appear as the image shown on the right (represented by object image data 310). As shown, a cropped and straight-on depiction of switchboard panel 404-2 is illustrated with several 'X's representing labeled keypoint features 508 that have been automatically or manually labeled. In this example, for instance, an LED in the top left corner, the numbered sticker, and each corner of the rows of sockets on the switchboard panel are each labeled with an 'X' to indicate that these are considered keypoint features that will be used by the machine learning model to recognize and estimate the pose of this object (once it is fully trained).

These prominent features of switchboard panel 404-2 shown to be labeled as keypoint features 508 in FIG. 5 may represent typical features that a human (e.g., user 304) may select for use as labeled keypoint features. Certain characteristics of these features may have the advantage of being relatively easy to identify as compared to other random points within the depiction that would be more easily conflated with other features (e.g., a socket in the middle of one of the rows, etc.). In examples where keypoint features are automatically identified, it may be more difficult for an automated process to key onto these distinctive features. However, even if random features or a regular or predetermined series of features (e.g., features at regular intervals on a grid such as at (0, 0), (5, 5), (10, 10), etc.) are automatically labeled as the keypoint features, certain machine learning models may be trained to recognize the target object using such features, thereby minimizing the effort required of the user. In some examples, models relying on such features, while functional, may require more significant computing resources to implement. Accordingly, there may be a tradeoff between the labeling effort required of the user and the computing resources required by the model that may be balanced and accounted for in the design of any particular implementation.

It will be understood that the "X"s illustrated in FIG. 5 may not actually be displayed as such on the image data. Rather, once labeled, coordinates representing the labeled keypoint feature locations with respect to the depiction of switchboard panel 404-2 may be stored in a JSON or other data structure associated image data representative of the panel image in any suitable way. Taken together, this cropped and manipulated image data and the information indicating the keypoint feature locations may be included in object image data 310 and provided to target data generation 312.

Figure 6:
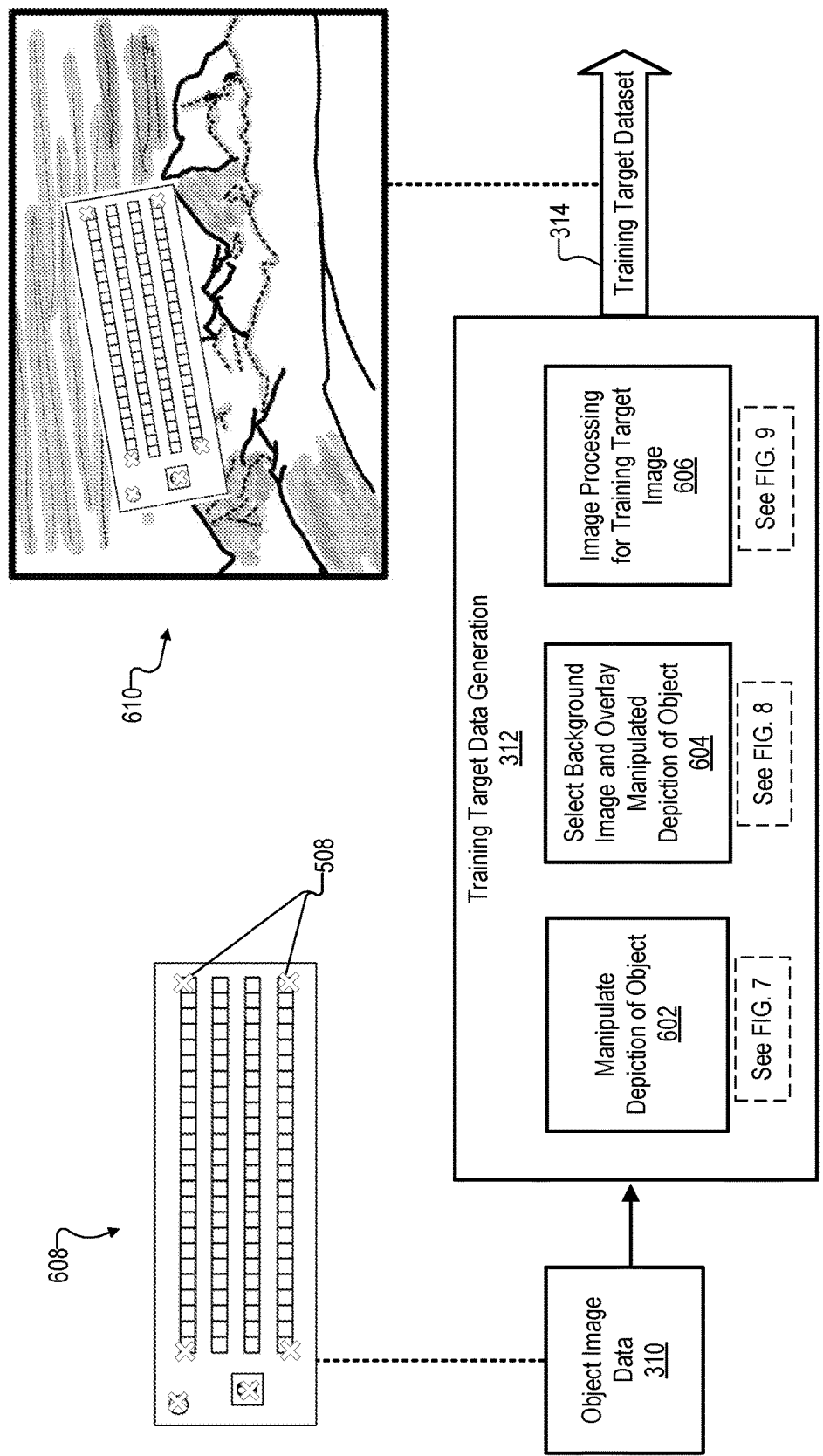
FIGS. 6-9 show illustrative aspects of how example object image data may be used to generate a training target dataset for use in constructing a machine learning model for pose estimation of an object in accordance with principles described herein.

To illustrate, FIG. 6 shows certain aspects of how object image data 310 (i.e., the cropped and manipulated depictions of the target object having the plurality of labeled keypoint features 508) may be used for target data generation 312. Specifically, as shown, a number of different operations included as part of target data generation 312 may ultimately result in the generation of training target dataset 314, which was mentioned above in relation to FIG. 3. As shown in FIG. 6, a first operation 602 that may be performed as part of target data generation 312 involves receiving object image data 310 and, for a particular depiction of the target object such as an object depiction 608 shown in FIG. 6 (it will be understood that object image data 310 may include several such depictions derived from several preliminary images 406, as described above), manipulating the depiction of the object. As indicated by the dashed box below operation 602, certain aspects of the manipulation of the object depiction will be described below in relation to FIG. 7. A second operation 604 that may be performed as part of target data generation 312 involves selecting a background image and overlaying the manipulated depiction of the object (generated as part of operation 602) onto the selected background image. As indicated by the dashed box below operation 604, certain aspects of the selection of the background image and the overlaying of the manipulated depiction will be described below in relation to FIG. 8. A third operation 606 that may be performed as part of target data generation 312 involves image processing for the particular training target image produced by operations 602 and 604. That is, after the object depiction is manipulated (at operation 602) and then overlaid onto a background image (at operation 604), further processing may be performed at operation 606 to finish the particular training target image and prepare it for inclusion in the training target dataset 314. As indicated by the dashed box below operation 606, certain aspects of the image processing of the training target image will be described below in relation to FIG. 9.

As has been mentioned, training target dataset 314 may include a relatively large number of training target images (e.g., a much larger number than the number of preliminary images 406 originally captured for inclusion in object image data 310). Each of the training target images included in training target dataset 314 will be understood to be generated based on one of the relatively few object depictions included in object image data 310 (e.g., object depiction 608 shown to be associated with object image data 310 in FIG. 6 serves as just one example). For each of these cropped, straightened, and labeled object depictions represented in object image data 310, operations 602-606 may be performed at least once, and possibly a large number of times (e.g., using different and possibly randomized values to add variation to the repeated performance of the operations), such that a plurality of training target images large enough in number to provide a suitable training set for the machine learning model may be output as training target dataset 314.

A single training target image 610 is illustrated in FIG. 6 as an example of just one of the training target images that may be included in training target dataset 314. In this example, a manipulated (e.g., scaled-down, rotated) and labeled depiction of the target object (based on object depiction 608) is shown to be overlaid onto a background image distinct and unrelated to the target object (a depiction of a mountain landscape in this example). Illustrated shading of the background image represents certain image processing for training target image 610 that has been performed prior to its inclusion in training target dataset 314. Each of operations 602-606 will now be described and illustrated in more detail to show how this particular training target image 610 example may be generated by one pass (of potentially many passes) of object image data 310 through the pipeline of target data generation 312.

Figure 7:
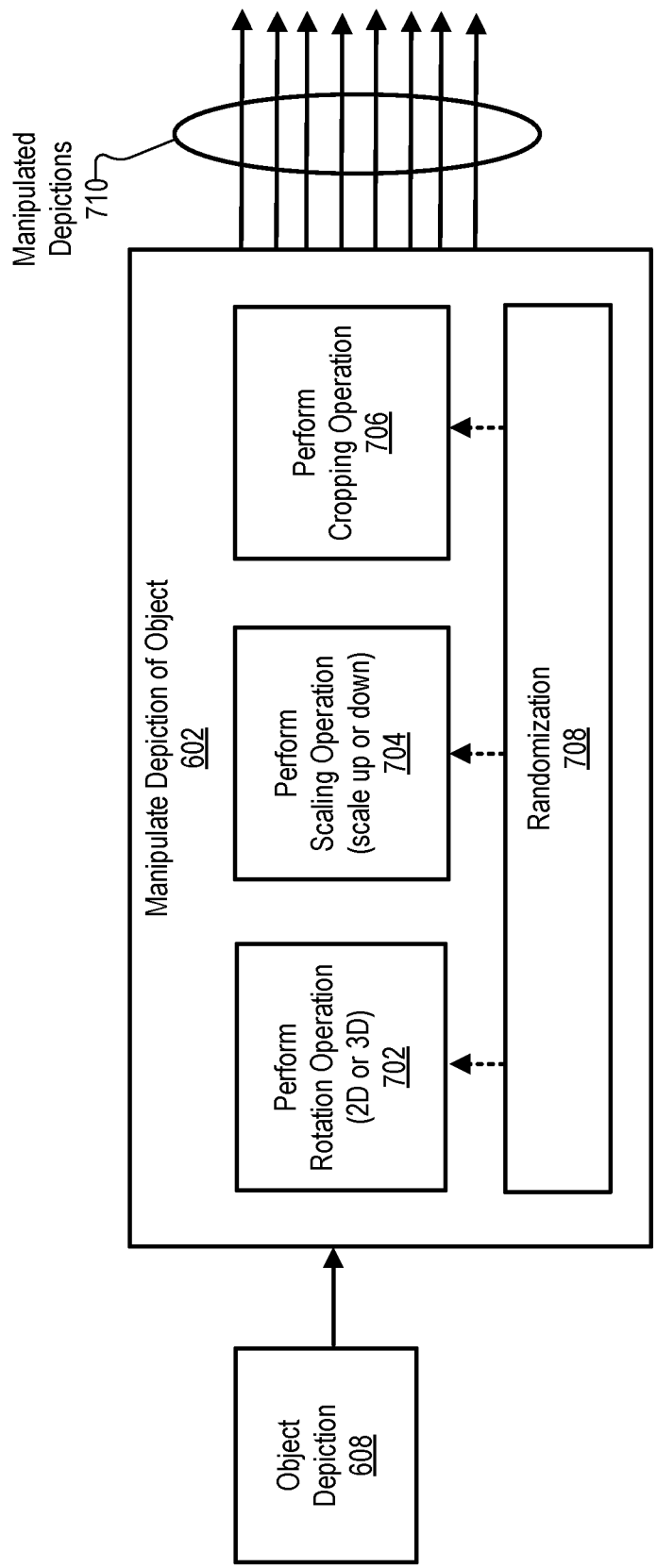

FIG. 7 shows certain aspects of operation 602 to illustrate in more detail how depictions of objects from object image data 310 (e.g., including the particular object depiction 608 illustrated for this example) may be manipulated as part of operation 602. Specifically, as shown, the manipulating of object depiction 608 may include performing at least one of: 1) a rotation operation 702 in which image processing techniques may be employed to rotate object depiction 608 with respect to two or three spatial dimensions ("Perform Rotation Operation (2D or 3D)"); 2) a scaling operation 704 in which a size of object depiction 608 is changed ("Perform Scaling Operation (scale up or down)"); and/or 3) a cropping operation 706 in which an occlusion of a portion of object depiction 608 is simulated ("Perform Cropping Operation").

Each of these manipulation operations 702-706 may be performed in any suitable way (e.g., in accordance with any known or novel image manipulation techniques, etc.) to provide variance to object depiction 608 so that a variety of unique training target images may ultimately be generated for training target dataset 314. To this end, for certain embodiments (e.g., embodiments in which the plurality of training target images are to be randomized training target images), the training target images (including training target image 610) may be generated using one or more random or pseudorandom values to perform various operations, including each of manipulation operations 702-706 performed in furtherance of the manipulating of the object depiction at operation 602.

As a first example of how variance may be injected into the training target images, the rotation of object depiction 608 at rotation operation 702 may be performed in any suitable rotation direction, to any suitable degree, and with respect to either two dimensions (e.g., rotating the depiction of the target object only along the x-y plane, only along the x-z plane, etc.) or with respect to all three spatial dimensions (e.g., rotating the object depiction within 3D space). Randomization 708 is shown in FIG. 7 to represent examples in which the random or pseudorandom values may be used to perform rotation operation 702. For example, the effect of randomization 708 on rotation operation 702 may be that a random or pseudorandom value is used to determine various aspects of how the rotation operation is performed, including whether object depiction 608 is rotated with respect to two spatial dimensions or three (and which two dimensions in the case of two), the degree to which object depiction 608 is rotated along each dimension (e.g., a randomized value between 0° and 90°), the direction in which each rotation is performed, and so forth. In certain examples, the same variation described as being introduced by randomization (e.g., randomization 708 and/or other examples of randomization described herein) may additionally or alternatively be introduced by systematic techniques (e.g., by programmatically altering the various aspects in accordance with a predefined plan rather than altering the aspects randomly or pseudo-randomly).

As a second example of how variance may be injected into the training target images, the scaling of object depiction 608 at scaling operation 704 may be performed in either direction (scaling up to be bigger or scaling down to be smaller) and to any suitable degree. Randomization 708 is further shown in FIG. 7 to represent examples in which the random or pseudorandom values may be used to perform scaling operation 704. For example, the effect of randomization 708 on scaling operation 704 may be that a random or pseudorandom value is used to determine various aspects of how the scaling operation is performed, including whether object depiction 608 is scaled up (changed to be bigger) or down (changed to be smaller), the degree to which object depiction 608 is scaled, and so forth.

As a third example of how variance may be injected into the training target images, the cropping of object depiction 608 at cropping operation 706 may be performed with respect to any portion of object depiction 608 (e.g., along any side or sides of the object depiction, etc.), along a straight line or with a more complex shape (e.g., to represent occlusion by a more complex shape), and to any suitable degree (e.g., up to about half of the object depiction being cropped out, since much more than that may not be particularly useful for training the machine learning model). Randomization 708 is further shown in FIG. 7 to represent examples in which the random or pseudorandom values may be used to perform cropping operation 706. For example, the effect of randomization 708 on cropping operation 706 may be that a random or pseudorandom value is used to determine various aspects of how the cropping operation is performed, including the shape of the crop (e.g., used to simulate occlusion by different shapes of objects), the amount of content that is cropped (e.g., used to simulate how much of the object is occluded), where the crop occurs (e.g., used to simulate what part of the target object is occluded), and so forth.

It will be understood that cropping operation 706 is different from the cropping described above at operation 502. Whereas operation 502 relates to removing background around the depiction of the target object of interest in a preliminary image (such that the result ideally depicts a relatively unobstructed view of the entire target object), this cropping operation 706 involves deliberately removing part of the object depiction so as to simulate, for a particular training target image being generated, an occlusion of that part of the target object by some other object in the environment.

Even for only a single object depiction 608 shown to be input in FIG. 7, operation 602 is shown to be capable of outputting a plurality of manipulated depictions 710 of the object. In this way, the compact amount of data requested from the user may begin to be multiplied into the relatively large number of unique training target images that may ultimately be desired for the training target dataset when robust training of a machine learning model is to be performed. Each of manipulated depictions 710 may represent a different (e.g., random) combination of ways that the single object depiction 608 was rotated (e.g., by randomized rotation operation 702), scaled (e.g., by randomized scaling operation 704), and/or cropped (e.g., by randomized cropping operation 706). A large number of manipulated depictions 710 may thus be generated from this particular object depiction 608 and it will be understood that other large numbers of similar manipulated depictions could likewise be generated from other object depictions derived from object image data 310 (e.g., based on other preliminary images 406, etc.). As will be shown and described in more detail below, each of the keypoint features previously labeled on object depiction 608 may be maintained and manipulated by each of the manipulation operations 702-706 such that each unique manipulated depiction 710 that is generated maintains accurate ground truth labeling indicative of the keypoint features of interest.

Figure 8:
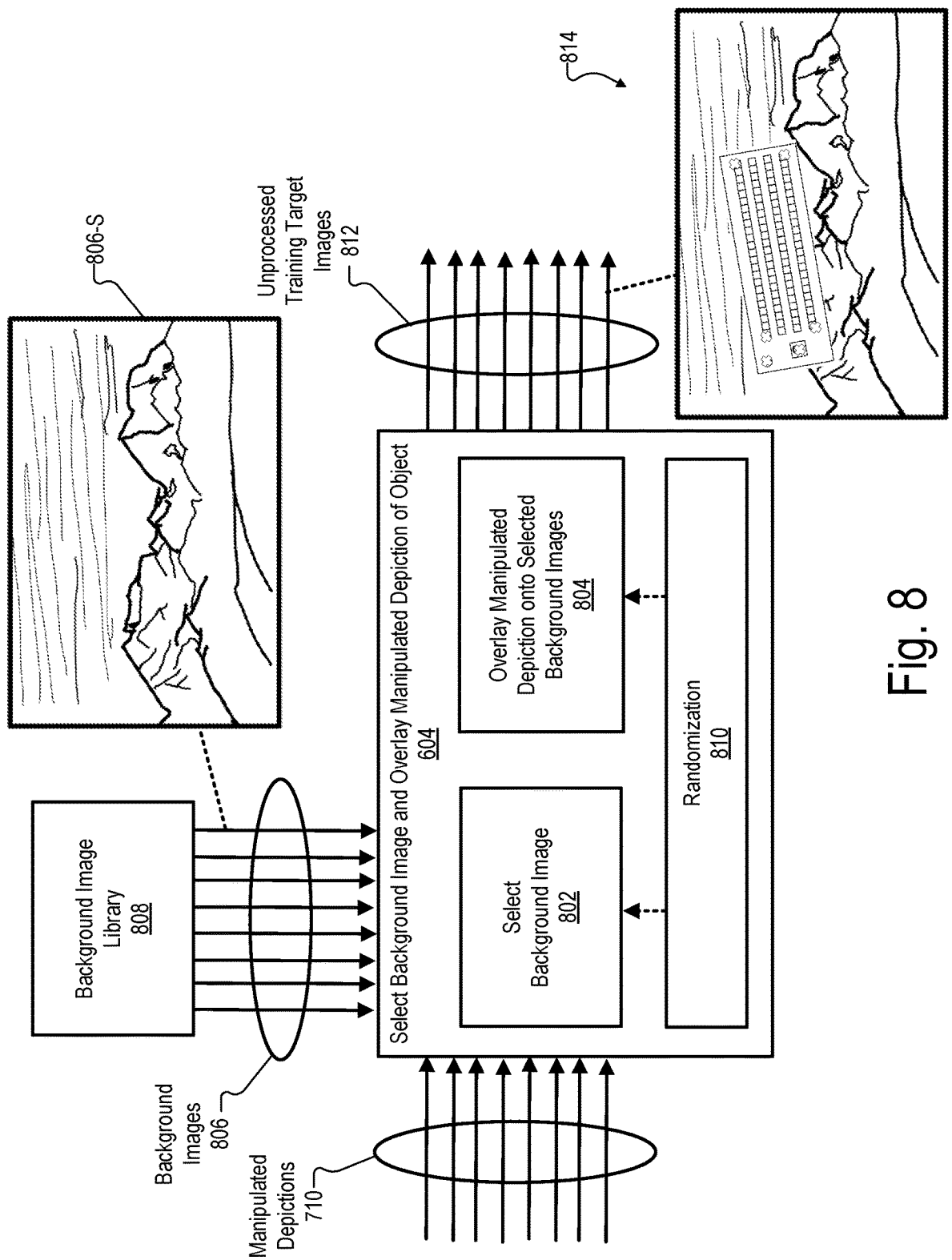

FIG. 8 shows certain aspects of operation 604 to illustrate in more detail how background images may be selected and how manipulated depictions 710 (generated by operation 602 as described and illustrated above in relation to FIG. 7) may be overlaid onto them as part of operation 604. Specifically, as shown, operation 604 may be performed by an operation 802 in which a background image is selected ("Select Background Image") and an operation 804 in which a manipulated depiction 710 is overlaid onto this background image ("Overlay Manipulated Depiction onto Selected Background Images").

A background image selected at operation 802 may be any suitable image as may serve a particular implementation. In some examples, for instance, the selected background image may be related to the preliminary images 406 captured for generation of the object image data 310 (e.g., images depicting the target object or a typical environment, such as a data center in the switchboard target object example, in which the target object may be encountered). In other examples, the selected background image may be distinct (e.g., unrelated in any significant way) from the object image dataset and the preliminary images included therein. For instance, as shown in FIG. 8, a background image may be selected at operation 802 from a set of background images 806 that may be available from a background image library 808. In this type of embodiment, a background image library such as background image library 808 may be a collection of images that is configured for use in generating training target datasets for a variety of objects (e.g., including the present target object but also including other types of objects). As such, background image library 808 may comprise background images 806 that are captured independently from image capture 302 associated with the present target object (e.g., a switchboard panel in the present example). For instance, background image library 808 may include a collection of images from the Internet, a set of stock image photos, or any other collection of images (e.g., including large and varied collections with lots of different types of images) that may be available and convenient to access.

FIG. 8 depicts one particular background image 806, labeled as "806-S" ('S' for "Selected"), to provide an example of a background image that may be selected at operation 802 from the plurality of background image 806 options that are available. As shown, background image 806-S depicts a mountain landscape with some wispy clouds in the sky. It is noted that an object such as the switchboard panel target object used in this example may not typically be encountered in an environment such as is depicted in background image 806-S. In this way, background image 806-S is distinct from object image dataset that depicts this particular target object. The background image may also be distinct from the object image dataset in the sense that background images 806 were captured at a different time, for a different purpose, and so forth, as compared to images of the object image dataset. However, as will be made apparent below, even with this lack of a relationship between the target object and the background image in this or other examples (e.g., background images such as rooms within a house, offices or other indoor spaces, etc.), training target images generated using these distinct background images 806 may function to train a machine learning model, especially when relatively large numbers of training target images are included in a training target dataset, as described herein.

Each of operations 802 and 804 may be performed in any suitable way (e.g., in accordance with any known or novel image manipulation techniques, etc.) to provide further variance (in addition to the variance created by the manipulations described in relation to FIG. 7) for a large set of unique training target images that are ultimately to be generated for training target dataset 314. To this end, for certain embodiments (e.g., embodiments in which the plurality of training target images are to be randomized training target images), the training target images may be generated using one or more random or pseudorandom values to perform not only manipulation operations 702-706 (described above), but also operations 802 and 804 performed in furtherance of operation 604.

As a first example of how variance may be injected into the training target images, the selection of one of background images 806 from background image library 808 at operation 802 may be randomized such that the selected background image 806-S represents a randomized (i.e., random or pseudorandom) selection from the library. Randomization 810 is shown in FIG. 8 to represent examples in which the random or pseudorandom values may be used to perform random background image selection for operation 802. For example, if background image library 808 includes 1000 images available for use as background images 806, operation 802 may generate a random or pseudorandom value between 1 and 1000 and use that value to index into the library and make the selection of background image 806-S.

As a second example of how variance may be injected into the training target images, each manipulated depiction 710 may be overlaid onto the selected background image 806-S at a randomized location on the background image. Here again, randomization 810 is shown in FIG. 8 to represent how this operation may be randomized by, for example, generating random or pseudorandom coordinates within the bounds of background image 806-S at which a particular manipulated depiction 710 of the target object is overlaid (e.g., right in the middle, near a side of the image, right on the edge such that a part of the depiction is out of frame, etc.). In some examples, more than one manipulated depiction 710 may be overlaid onto a single selected background image. For example, a particular training target image being generated may involve further manipulating an additional depiction of the object represented within the object image data (e.g., a second plurality of manipulated depictions 710) and further overlaying this additional manipulated depiction of the object onto the selected background image (e.g., selected background image 806-S) together with the manipulated depiction of the object. This overloading of object depictions onto a single training target image may too be randomized as represented by randomization 810. For instance, a random integer between one and three could be generated in connection with each selected background image such that that number of manipulated depictions 710 may be overlaid (e.g., at different and possibly randomized places) onto the background image.

Operation 604 illustrates several ways in which the compact object image data may be further multiplied to grow toward the relatively large number of unique training target images that may ultimately be desired for training target dataset 314. As a few examples, a single manipulated depiction 710 may be overlaid onto a variety of different background image 806 (in randomized ways) to create a large number of unprocessed training target images 812, various different combinations of manipulated depictions 710 may be overloaded onto each background image 806 to create an even larger number of unprocessed training target images 812, the manipulated depiction 710 (or combination of multiple manipulated depictions 710) may be overlaid in several different locations on any given selected background image, and so forth. Indeed, with a large background image library and significant randomization 708 and 810, even one preliminary image 406 could plausibly be used to derive hundreds or thousands of unique unprocessed training target images 812. To illustrate one particular example, an unprocessed training target image 814 depicted in FIG. 8 shows the mountainous landscape of selected background image 806-S overlaid with the manipulated and scaled depiction of the target object at a particular (e.g., random) place on the image. As illustrated by the 'X's marking the prominent features (e.g., corners, sticker, etc.) of the object, each of the keypoint features previously labeled on object depiction 608 may be carried through the manipulation and overlaying operations such that unprocessed training target image 814 (and each of the other unique unprocessed training target images 812 that may be generated) maintains accurate labeling of the keypoint features of interest.

Figure 9:
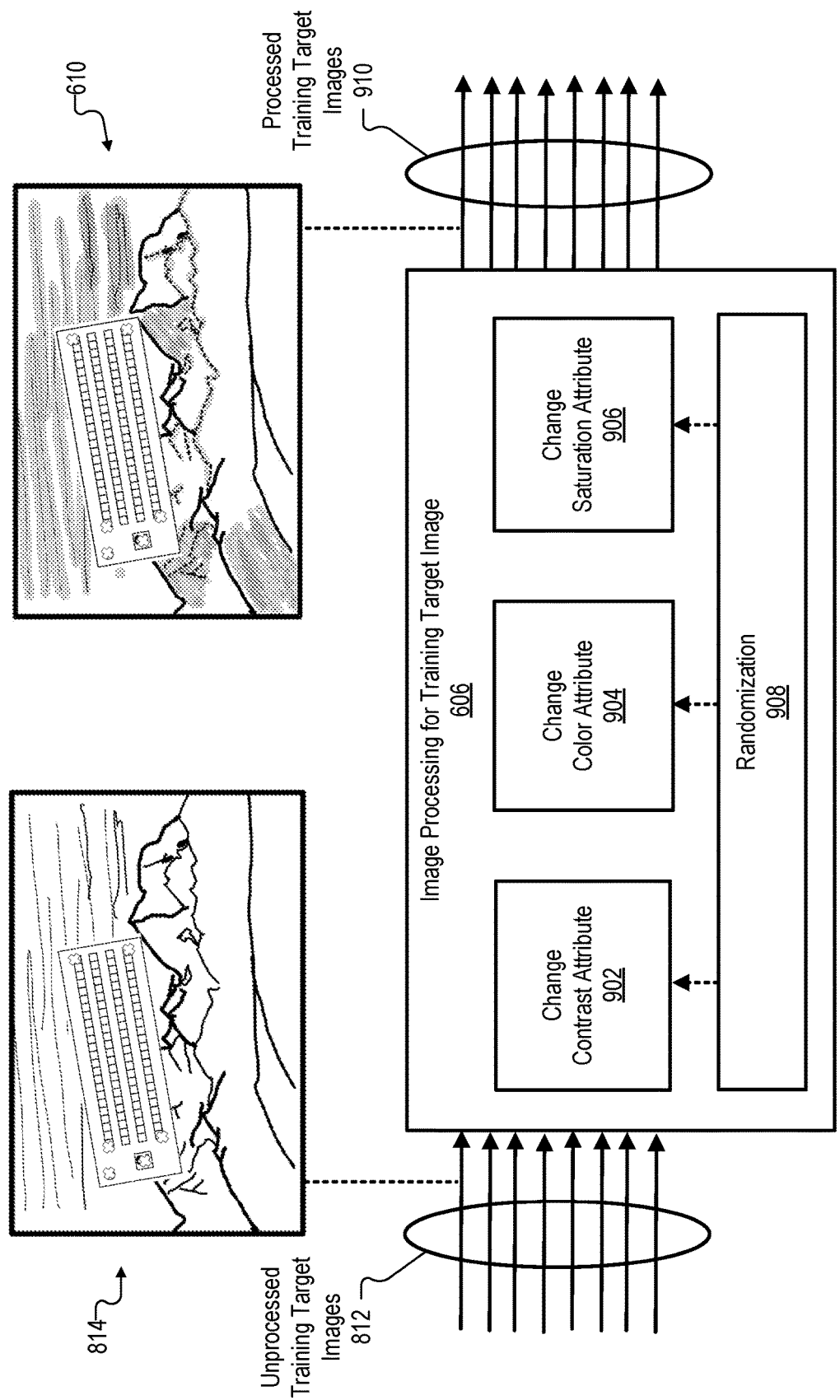

FIG. 9 shows certain aspects of operation 606 to illustrate in more detail how further variance of training target images may be injected into the final training target dataset 314 by image processing that may be performed with respect to each of the unprocessed training target images 812 (generated by operation 604 as described and illustrated above in relation to FIG. 8). For example, generating each training target image may further include applying, subsequent to the overlaying of the manipulated depiction of the object onto the selected background image, an image processing operation 606 to the training target image. This image processing operation 606 may change at least one of a contrast attribute, a color attribute, or a saturation attribute of the training target image. Specifically, as shown, operation 606 may be performed by one or more of: 1) an operation 902 in which a contrast attribute of a given unprocessed training target image 812 is changed ("Change Contrast Attribute"); 2) an operation 904 in which a color attribute of the unprocessed training target image 812 is changed ("Change Color Attribute"); 3) an operation 906 in which a saturation attribute of the unprocessed training target image 812 is changed ("Change Saturation Attribute"); and/or any other such image processing changes as may serve to add variety to the training target images in a particular implementation. For example, operations 902-906 may be applied so as to simulate different lighting conditions, to simulate different types of image capture devices or scenarios that may be encountered by the machine learning model, and generally to add more variance to the ultimate training set. In some examples, operations 902-906 may be performed so as to apply changes across the entirety of an unprocessed training target image 812. In other examples, the image processing of any or all of operations 902-906 may be applied to only part of the unprocessed training target image (e.g., to the background, to the object depiction, to some other region, to a combination of these, etc.).

By performing image processing on each unprocessed training target image 812, at least the same number of processed training target images 910 may be generated as unprocessed training target images 812 that are processed. Additionally, randomization 908 may be used in similar ways as randomization described above so as to further multiply the number of output images that may be generated (e.g., such that there could be many more processed training target images 910 than unprocessed training target images 812). For example, randomization 908 may be used to randomly or pseudo-randomly determine which unprocessed training target images 812 are to be processed (e.g., as some may pass through unprocessed), and how those that are selected for processing are changed. Randomization 908 may be used to determine which combination of operations 902-906 is to be applied for each image (one, two, or all three of these operations), the manner in which each attribute is changed (e.g., if the contrast is increased or decreased, if the color is skewed more toward the red or the blue, etc.), the degree to which each attribute is changed, and so forth.

One particular example of a processed training target image 910 is depicted in FIG. 9. As shown, this processed training target image will be understood to be training target image 610 that was described above in relation to FIG. 6. The remainder of processed training target images 910 will also be understood to be included in the training target dataset now that all of the image processing is complete. As shown, the final training target image 610 in FIG. 9 is similar to the unprocessed training target image 814 included in the unprocessed training target images 812 being processed by operation 606. However, various shading of the mountains and the clouds is drawn to represent various contrast, color, saturation, and/or other image processing effects that may have been applied by operation 606. As with each step in the pipeline described above, and as is illustrated by the 'X's still present to mark the prominent features of the object, the keypoint features previously labeled on object depiction 608 may be carried through this image processing operation as well such that training target image 610 (and each of the other unique processed training target images 910 that may be generated) still maintains accurate ground truth labeling of the keypoint features.

Returning to FIG. 3, the target data generation 312 that has been described in relation to FIGS. 6-9 may produce training target dataset 314 which, as shown in configuration 300-1, system 100 may use for model training 316 of machine learning model 318. Model training 316 may be performed in any suitable way to train any type of machine learning model 318 as may serve a particular implementation. As one example, a deep learning model that uses a convolutional neural network may be developed with a sufficiently balanced and statistically large training target dataset. For instance, system 100 may load a deep learning model architecture into memory and proceed to perform a training loop that ultimately results (once a performance metric is satisfied) in a set of model weights being generated and saved as the deep learning model (i.e., the implementation of machine learning model 318). The training loop may involve accessing batches of training target data (e.g., from training target dataset 314), predicting keypoint feature locations on various training target images based on the current model weights, calculating the difference between predicted keypoint feature locations and actual keypoint feature locations, determining if the difference is suitably small to satisfy the performance metric, and, until it is sufficient, updating the model weights based on the computed difference and returning to access more training target data to continue the process.

Figure 10:
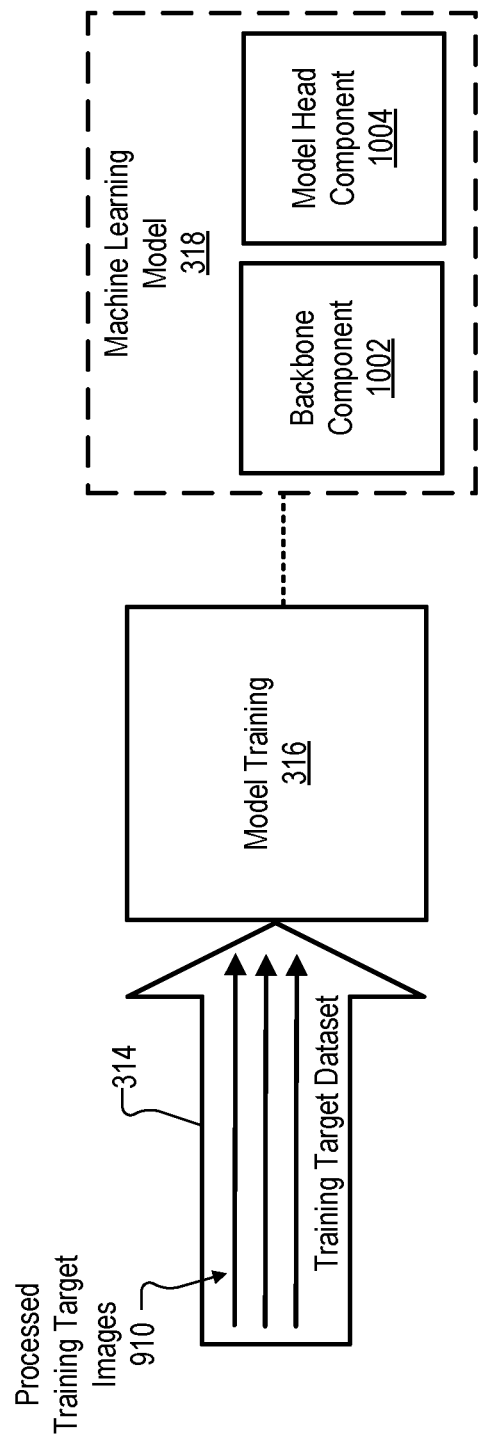
FIG. 10 shows illustrative aspects of how a training target dataset may be used to train a machine learning model for pose estimation of an object in accordance with principles described herein.

To illustrate the model training and constructed machine learning model in more detail, FIG. 10 shows illustrative aspects of how training target dataset 314 may be used to train machine learning model 318 (e.g., a deep learning model in certain examples) for pose estimation of a target object in accordance with principles described herein. As shown, training target dataset 314 (which, as mentioned above and as illustrated in FIG. 10, may include a large number of processed training target images 910) may be input to model training 316 to be used in construction and training of machine learning model 318.

FIG. 10 shows one particular way in which machine learning model 318 may be configured. Specifically, in this example, machine learning model 318 may be implemented by a convolutional neural network (e.g., a deep learning model) that includes: 1) a backbone component 1002 configured to progressively process input images using a series of convolutional layers; and 2) a particular model head component 1004 configured to recognize the target object and estimate its pose within the processed input images provided by backbone component 1002.

Backbone component 1002 may be configured to receive input images (e.g., images captured when the machine learning model is being used in operation, such as illustrated in configuration 300-2) and to break down these input images in a manner that facilitates model head component 1004 in analyzing the images to determine if an instance of the target object is present (and, if it is, how the object is estimated to be posed). For example, one implementation of backbone component 1002 may be composed of repeating blocks containing a 2D convolution followed by a ReLU activation and a batch normalization layer. In this example, the backbone component may include several (e.g., five) different sections with varying numbers of convolutional blocks. Each section may be configured to reduce the area of the input image by one quarter, such that the backbone component ultimately reduces and breaks down an input image to, for instance, 1/1024$^{th}$ of its original area. Output from each section may be combined via bilinear upsampling and a single convolution at each section, such that the final total makes up the output. Backbone component 1002 may be untrained or pretrained on a set of challenge data (e.g., ImageNet, etc.) so as to learn to identify different shapes and patterns that tend to hold and be useful in a variety of tasks.

The output of backbone component 1002 may be provided to model head component 1004, which may be specialized (i.e., specifically trained) to perform tasks described herein with respect to the particular target object (e.g., to recognize and estimate the pose of a planar target object such as a switchboard object, a single switchboard panel included on such an object, or the like). As has been mentioned, there are several ways that a model head may perform these functions and different types of model head components 1004 that may be employed to this end.

As a first example, model head component 1004 may be implemented as an anchor-based model head component configured to designate a plurality of anchor areas within the input images and to search each of the plurality of anchor areas for an instance of the object. The anchor areas may be consistently designated for each input image, dependent on the size of the input image. For example, for input images that are 384×384 pixels, 9400 anchors of different shapes and sizes and locations within the input image may be defined to direct the search for any depiction of the target object that may be present. Each of the anchors may be checked, based on the training, to determine if they appear to include a depiction of the target object and, in the event that one does, the model can be used to indicate the likely locations of the keypoint features, which may then be used to determine a homography (e.g., a pose estimation) of the object. In certain implementations, an anchor-based model head component may include a feature pyramid to facilitate prediction at multiple scales. For example, each level of such a feature pyramid may have an attached output head and its own set of anchors (depending upon the level in the feature pyramid). The output from each head may have three dimensions: 1) a batch size (e.g., the number of training or images processed at a time), 2) an anchor dimension, and 3) an output dimension with various values (e.g., a logit value for a sigmoid that states whether the anchor is predicted to be signal or background, several values for center offsets and extent offsets from the anchor that may better fit the target object in the event that it is a signal bearing anchor, several values that indicate coordinates of the keypoint features in the anchor's relative coordinate system, etc.).

As a second example, model head component 1004 may be implemented as a segmentation-based model head component configured to semantically segment the input images to differentiate instances of the object from other image content depicted in the input images. For instance, this type of model head may make an individual prediction for every pixel in a given input image to indicate whether it is likely to be a keypoint feature of the target object or not. This type of model head may leverage a final upsampling layer on the backbone component to bring the shape of the input image back to its original shape as predictions are made whether each of the pixels belongs to the background or a keypoint. As has been mentioned, one advantage of a semantic segmentation model head is that no manual labeling may be required to be performed by a user; rather, a grid of features may be autonomously labeled without human supervision. While this reduces the effort needed to be performed by the user overseeing the model construction (e.g., user 304), however, it will be understood that a segmentation-based model head may be significantly larger (and require a commensurate amount of additional compute resources) than a similarly-performing anchor-based model head component (which may be small enough to execute on relatively modest compute resources such as those possessed by a mobile device or other AR presentation device).

As has been mentioned, certain target objects may have physical characteristics that may be leveraged to facilitate recognizing the objects more reliably and accurately. For instance, example target objects have been described and illustrated herein relating to a switchboard object that includes a plurality of switchboard panels (e.g., switchboard panels that look similar to one another and that collectively make up the switchboard object, such as illustrated in FIG. 4). As mentioned above, machine learning model 318 may be trained to recognize such objects in multiple phases that rely on the predictable physical relationship between the larger object (i.e., the switchboard in this example) and the sub-objects that make it up (i.e., the switchboard panels in this example). For example, with this type of target object, model training 316 may be performed in two phases including: 1) a first phase in which a prospective recognition of the switchboard is performed based on a subset of keypoint features identified within the input images, and 2) a second phase in which a confirmed recognition of the switchboard is performed based on the prospective recognition of the first phase and based on respective full sets of keypoint features identified within the input images for each of the plurality of switchboard panels.

Returning to FIG. 3, configuration 300-1 is shown to extend until model training 316 of machine learning model 318 is performed based on training target dataset 314. Once machine learning model 318 has been fully constructed (including training) in accordance with principles described above, configuration 300-2 illustrates certain aspects of how machine learning model 318 may be used ("Model Operation") in the context of a particular extended reality application. Specifically, as shown (and as mentioned above), user 324 may operate AR presentation device 322 within scene 320 and the device may employ machine learning model 318 to differentiate between target objects it has been trained on (e.g., target objects 306) and other, non-target objects in the scene (e.g., objects 326). With an ability to recognize and estimate the pose of target objects enabled by machine learning model 318, AR presentation device 322 may provide user 324 with any type of extended reality (e.g., augmented reality) experience or application as may serve a particular implementation.

Figure 11:
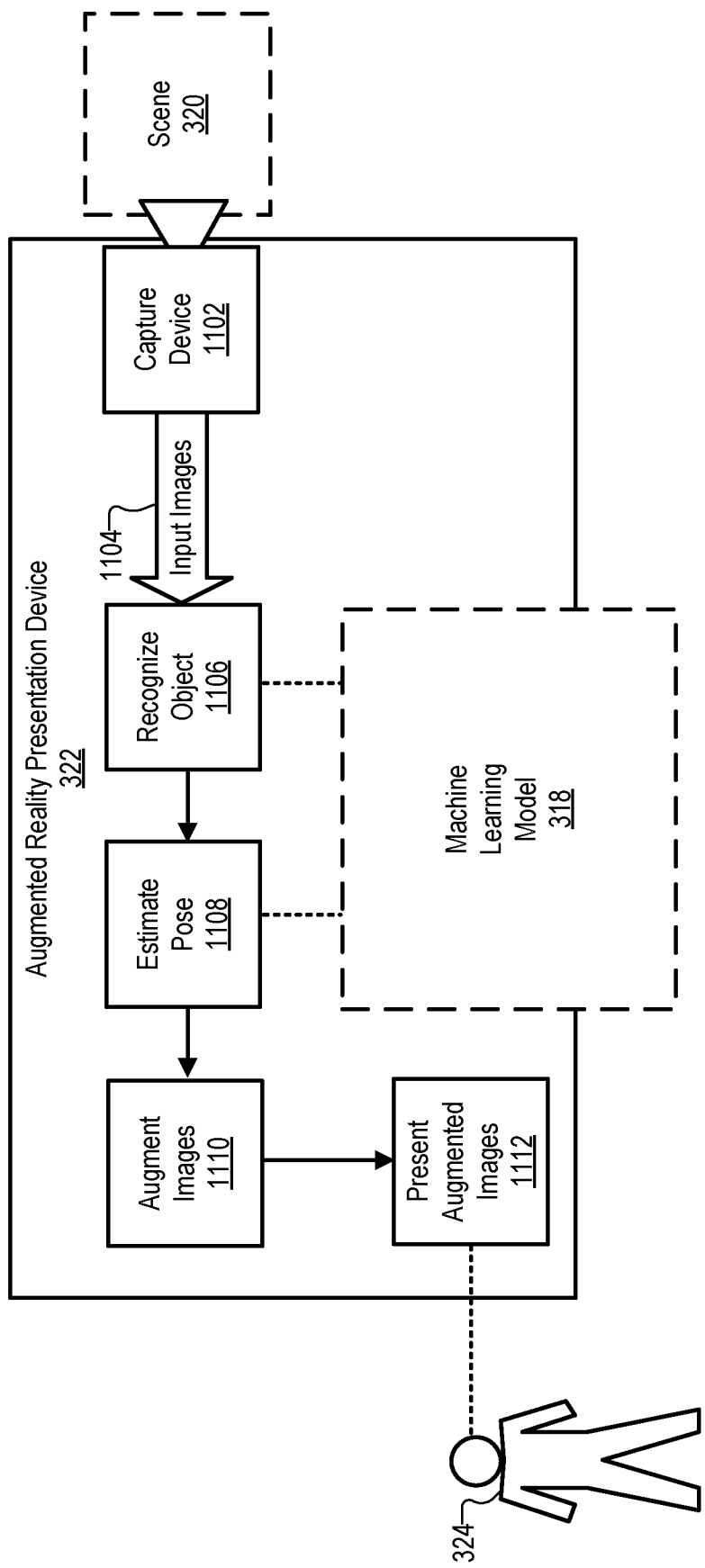
FIG. 11 shows an illustrative augmented reality presentation device that uses a machine learning model trained in accordance with principles described herein to perform pose estimation of objects encountered in a scene.

To further illustrate AR presentation device 322 and how the trained machine learning model 318 may be employed in operation, FIG. 11 shows certain elements of an example implementation of AR presentation device 322 used by user 324. More particularly, FIG. 11 shows how these elements may leverage and use machine learning model 318 once it has been trained, in accordance with principles described herein, to recognize and estimate the pose of objects encountered at scene 320 and depicted in input images analyzed using the trained machine learning model.

AR presentation device 322 may be implemented as a mobile device (e.g., a smartphone, a tablet, etc.), a specialized extended reality device (e.g., an augmented/mixed reality headset configured to present an augmented or mixed reality world to a user wearing the headset), a laptop or other general purpose computing device, or any other device as may serve a particular implementation. As shown in FIG. 11, AR presentation device 322 may include a capture device 1102 configured to capture input images 1104 from scene 320. Capture device 1102 may be implemented, for example, by a camera built into the device (e.g., a back-facing video camera on the mobile device, a camera built into the extended reality device, etc.) or a camera that is separate from, but communicatively coupled with, the device (e.g., a camera connected to the laptop, etc.). In some examples, input images 1104 may include images of scene 320 that are captured individually (e.g., when user 324 snaps a photo within the space). In other examples, input images 1104 may include images of a video sequence that streams from capture device 1102 acting as a video camera that continuously captures several images per second. In either case, it will be understood that input images 1104 may or may not depict instances of the target object that machine learning model 318 has been trained to recognize and perform pose estimation for (e.g., depending on whether that type of object is present at scene 320, depending on how capture device 1102 is oriented with respect to instances of the object that are present, etc.).

Input images 1104 are shown to be provided by capture device 1102 to facilities 1106 and 1108 of AR presentation device 322 that are configured to identify instances of the target object within the input images 1104 (e.g., "Recognize Object" at facility 1106) and, when such instances are identified or recognized, to determine an estimation for how the target object is posed with respect to AR presentation device 322 (e.g., "Estimate Pose" at facility 1108). More particularly, based on machine learning model 318, facility 1106 may recognize the target object as depicted within a particular input image 1104 captured by capture device 1102 and facility 1108 may provide an estimate of the pose of the object for use by AR presentation device 322 in an augmented reality application associated with the target object (as will be described in more detail below).

Both facilities 1106 and 1008 may perform their respective functions based on the machine learning model 318 that has been constructed and trained in accordance with principles described above. In some examples, machine learning model 318 may be stored or fully incorporated within memory of AR presentation device 322 such that the target object may be recognized by AR presentation device 322 without assistance or communication with other outside entities. In other examples, machine learning model 318 may be at least partially implemented or stored external to AR presentation device 322 (e.g., on a MEC or cloud server, or on other computing resources external to AR presentation device 322). To represent these different potential ways that machine learning model 318 may be implemented, the model is illustrated in FIG. 11 to be largely included in AR presentation device 322 but also to extend beyond its borders.

Facilities 1106 and 1108 may utilize machine learning model 318 to perform the respective object recognition and pose estimation functions in any manner as may serve a particular implementation. For example, these facilities may be configured to analyze a particular input image 1104 (e.g., a particular video frame) received from capture device 1102 by predicting keypoints features from the input image 1104 and comparing them to template keypoints features from a face-on view. If possible (e.g., if the target object is found in the input image) the keypoint features may be paired by keypoint ID and a homography between the corresponding 2D keypoint features may be computed. Using this homography, a 3D pose (e.g., a 6DOF pose, etc.) may then be computed. For example, the corners of the face-on depiction of the target object may be wrapped into the image space such that the 3D pose may be determined (e.g., using SolvePnP or another suitable algorithm) based on the face-on 3D corner positions. The 3D pose may include rotation and transition vectors that indicate how the pose of AR presentation device 322 (and the particular vantage point of capture device 1102 in particular) relates to the pose of the target object within scene 320.

The 2D and/or 3D estimated pose of the target object, after being estimated by facility 1108, may be provided to a facility 1110 that is configured to augment the input images ("Augment Images"). Such augmentation may be performed in any suitable way that may be of use for the particular augmented reality application being provided. For example, an augmented reality application may be configured to assist user 324 in performing a particular action with respect to the target object and the estimate of the pose of the target object may therefore be used by the augmented reality application to augment input images 1104 with integrated guidance information for the performing of the particular action. Some examples of actions with which AR presentation device 322 may assist user 324 involve operating a target object, maintaining the target object, repairing or troubleshooting the target object, and so forth. For instance, taking the switchboard object illustrated in various examples above as an example, images of this object may be augmented to conveniently shows that a particular cable may need to be removed from one particular socket and/or plugged into another particular socket. Following written instructions for such maintenance or operation of the switchboard may be difficult and prone to error (e.g., due to the complexity of the switchboard and the large number of similar looking sockets, which could easily be confused). However, by augmenting images of the object, specific instructions may be overlaid onto the depictions of the switchboard in ways that make it easy to perform the maintenance tasks and much less prone to error.

At facility 1112, augmented images (e.g. input images 1104 in which additional content has been overlaid onto the recognized target object at its particular location and orientation within the scene) may be displayed ("Present Augmented Image") to user 324. For example, the augmented images may be displayed on a heads-up display or semi-transparent display of an augmented reality headset, on a screen of a mobile device or laptop computer, or the like, as may serve a particular implementation. Once one video frame (e.g. one input image 1104) has been augmented and presented in this way, additional frames being captured by capture device 1102 may be similarly augmented and displayed by updating the estimated pose and the augmentations. Accordingly, even as user 324 moves around within scene 320, the overlaid instructions of the augmented reality application may appear to remain attached to the target object at the pose of the object with respect to the moving capture device 1102 continuously shifts.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 12:
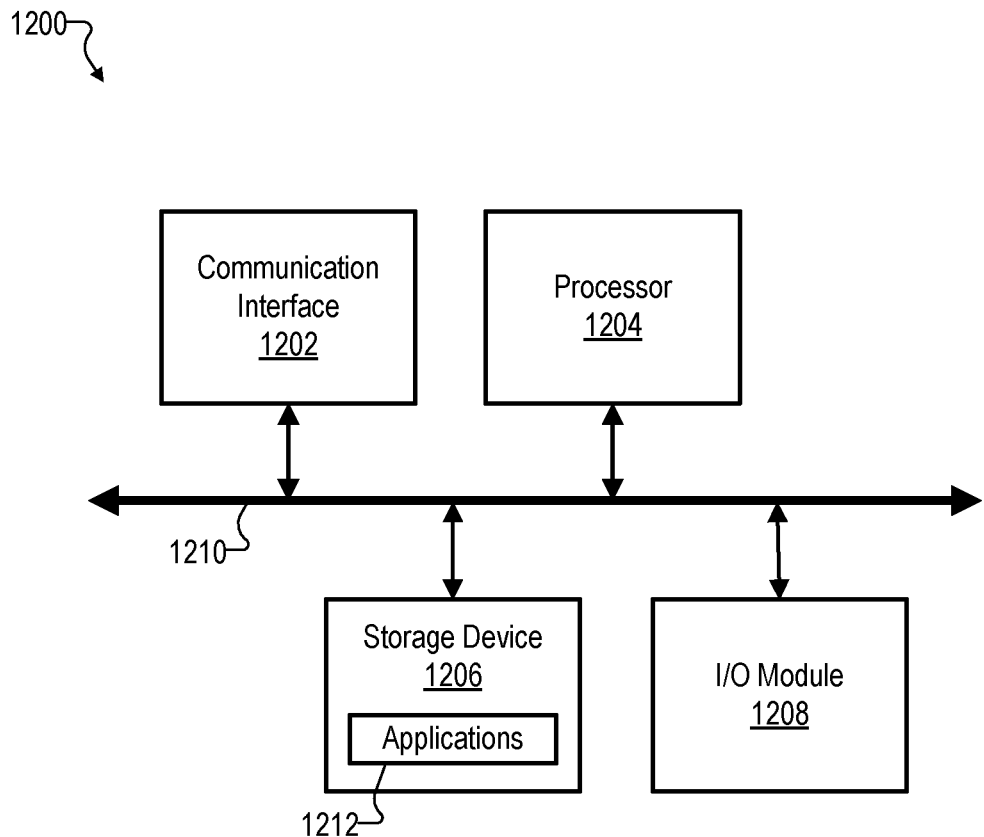
FIG. 12 shows an illustrative computing system that may implement model construction systems and/or other computing systems described herein.

FIG. 12 shows an illustrative computing system 1200 that may implement model construction systems and/or other computing systems described herein. For example, computing system 1200 may include or implement (or partially implement) model construction systems such as any implementations of system 100 described herein, any of the components that they implement (e.g., facilities for performing operations described herein, etc.), devices used by users to generate data for model construction (e.g., an image capture device for image capture 302) or to engage augmented reality applications (e.g., AR presentation device 322), and/or any other computing devices or systems described herein (or any elements or subsystems thereof).

As shown in FIG. 12, computing system 1200 may include a communication interface 1202, a processor 1204, a storage device 1206, and an input/output (I/O) module 1208 communicatively connected via a communication infrastructure 1210. While an illustrative computing system 1200 is shown in FIG. 12, the components illustrated in FIG. 12 are not intended to be limiting. Additional or alternative components may be used in other embodiments. Components of computing system 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1206. For example, data representative of one or more executable applications 1212 configured to direct processor 1204 to perform any of the operations described herein may be stored within storage device 1206. In some examples, data may be arranged in one or more databases residing within storage device 1206.

I/O module 1208 may include one or more I/O modules configured to receive user input and provide user output. One or more I/O modules may be used to receive input for a single virtual experience. I/O module 1208 may include any hardware, firmware, software, or combination thereof supportive of input and output capabilities. For example, I/O module 1208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 1200. For example, one or more applications 1212 residing within storage device 1206 may be configured to direct processor 1204 to perform one or more processes or functions associated with processor 104 of system 100. Likewise, memory 102 of system 100 may be implemented by or within storage device 1206.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
   accessing, by a model construction system, object image data representative of one or more images depicting an object having a plurality of labeled keypoint features;
   generating, by the model construction system and based on the object image data, a training target dataset including a plurality of training target images, wherein a particular training target image of the plurality of training target images is generated by:
      selecting a background image from a set of background images distinct from the object image data, manipulating a depiction of the object represented within the object image data, and overlaying the manipulated depiction of the object onto the selected background image together with an indication of labeled keypoint features for the manipulated depiction; and training, by the model construction system based on the training target dataset, a machine learning model to recognize and estimate a pose of the object when the object is depicted in input images analyzed using the trained machine learning model.

2. The method of claim 1, wherein the manipulating of the depiction of the object includes performing at least one of:

a rotation operation to rotate the depiction of the object with respect to two or three spatial dimensions; or a scaling operation to change a size of the depiction of the object.

3. The method of claim 1, wherein the manipulating of the depiction of the object includes performing a cropping operation to simulate an occlusion of a portion of the depiction of the object.

4. The method of claim 1, wherein:

the set of background images corresponds to a background image library configured for use in generating training target datasets for a variety of objects including the object and other objects; and the background image library comprises background images that are captured independently from image capture associated with the object.

5. The method of claim 1, wherein:

the particular training target image is further generated by applying, subsequent to the overlaying of the manipulated depiction of the object onto the selected background image, an image processing operation to the particular training target image; and the image processing operation changes at least one of a contrast attribute, a color attribute, or a saturation attribute of the particular training target image.

6. The method of claim 1, further comprising:

recognizing, based on the machine learning model, the object as depicted within a particular input image captured by an augmented reality presentation device; and providing, based on the machine learning model, an estimate of the pose of the object for use by the augmented reality presentation device in an augmented reality application associated with the object.

7. The method of claim 6, wherein:

the augmented reality application is configured to assist a user in performing a particular action with respect to the object; and the estimate of the pose of the object is used by the augmented reality application to augment the particular input image with integrated guidance information for the performing of the particular action.

8. The method of claim 1, wherein the accessing of the object image data includes:

receiving a set of preliminary images depicting the object from a plurality of different vantage points; and generating the object image data based on the set of preliminary images by:

cropping each preliminary image around the object, manipulating each preliminary image to simulate a straight-on vantage point of the object, and automatically labeling, or providing a user interface for manually labeling, keypoint features of the object within each preliminary image subsequent to the cropping and manipulating of the preliminary image.

9. The method of claim 1, wherein:

the plurality of training target images are randomized training target images; and the particular training target image is generated using one or more random or pseudorandom values to perform:

the selecting of the background image from the set of background images;

the manipulating of the depiction of the object; and the overlaying of the manipulated depiction of the object onto the selected background image.

10. The method of claim 1, wherein:

the particular training target image is further generated by manipulating an additional depiction of the object represented within the object image data; and overlaying the additional manipulated depiction of the object onto the selected background image together with the manipulated depiction of the object.

11. The method of claim 1, wherein the machine learning model is implemented by a convolutional neural network that includes:

a backbone component configured to progressively process the input images using a series of convolutional layers; and an anchor-based model head component configured to designate a plurality of anchor areas within the input images and to search each of the plurality of anchor areas for an instance of the object.

12. The method of claim 1, wherein the machine learning model is implemented by a convolutional neural network that includes:

a backbone component configured to progressively process the input images using a series of convolutional layers; and a segmentation-based model head component configured to semantically segment the input images to differentiate instances of the object from other image content depicted in the input images.

13. The method of claim 1, wherein:

the object is a switchboard that includes a plurality of switchboard panels; and the machine learning model is trained to recognize the object in two phases including:

a first phase in which a prospective recognition of the switchboard is performed based on a subset of keypoint features identified within the input images, and a second phase in which a confirmed recognition of the switchboard is performed based on the prospective recognition of the first phase and based on respective full sets of keypoint features identified within the input images for each of the plurality of switchboard panels.

14. A system comprising:

a memory storing instructions; and one or more processors communicatively coupled to the memory and configured to execute the instructions to perform a process comprising:

accessing object image data representative of one or more images depicting an object having a plurality of labeled keypoint features;

generating, based on the object image data, a training target dataset including a plurality of training target images, wherein a particular training target image of the plurality of training target images is generated by:

selecting a background image from a set of background images distinct from the object image data, manipulating a depiction of the object represented within the object image data, and overlaying the manipulated depiction of the object onto the selected background image together with an indication of labeled keypoint features for the manipulated depiction; and training, based on the training target dataset, a machine learning model to recognize and estimate a pose of the object when the object is depicted in input images analyzed using the trained machine learning model.

15. The system of claim 14, wherein the manipulating of the depiction of the object includes performing at least one of:

a rotation operation to rotate the depiction of the object with respect to two or three spatial dimensions; or a scaling operation to change a size of the depiction of the object.

16. The system of claim 14, wherein the manipulating of the depiction of the object includes performing a cropping operation to simulate an occlusion of a portion of the depiction of the object.

17. The system of claim 14, wherein:

the set of background images corresponds to a background image library configured for use in generating training target datasets for a variety of objects including the object and other objects; and the background image library comprises background images that are captured independently from image capture associated with the object.

18. The system of claim 14, wherein:

the particular training target image is further generated by applying, subsequent to the overlaying of the manipulated depiction of the object onto the selected background image, an image processing operation to the particular training target image; and the image processing operation changes at least one of a contrast attribute, a color attribute, or a saturation attribute of the particular training target image.

19. The system of claim 14, wherein the process further comprises:

recognizing, based on the machine learning model, the object as depicted within a particular input image captured by an augmented reality presentation device; and providing, based on the machine learning model, an estimate of the pose of the object for use by the augmented reality presentation device in an augmented reality application associated with the object.

20. A non-transitory computer-readable medium storing instructions that, when executed, direct a processor of a computing device to perform a process comprising:

accessing object image data representative of one or more images depicting an object having a plurality of labeled keypoint features;

generating, based on the object image data, a training target dataset including a plurality of training target images, wherein a particular training target image of the plurality of training target images is generated by:

selecting a background image from a set of background images distinct from the object image data, manipulating a depiction of the object represented within the object image data, and overlaying the manipulated depiction of the object onto the selected background image together with an indication of labeled keypoint features for the manipulated depiction; and training, based on the training target dataset, a machine learning model to recognize and estimate a pose of the object when the object is depicted in input images analyzed using the trained machine learning model.

* * * * *